(12) United States Patent
Kerr et al.

(10) Patent No.: US 9,982,315 B2
(45) Date of Patent: May 29, 2018

(54) PROCESS INCLUDING A CARBONATION STEP

(71) Applicant: T&L SUGARS LIMITED, London (GB)

(72) Inventors: John Kerr, London (GB); Anthony Baiada, London (GB); Robert Jansen, London (GB); Matthew Shue, London (GB); Gordon Walker, London (GB)

(73) Assignee: T&L SUGARS LIMITED, London (GB)

( * ) Notice: Subject to any disclaimer, the term of this patent is extended or adjusted under 35 U.S.C. 154(b) by 92 days.

(21) Appl. No.: 14/913,179

(22) PCT Filed: Aug. 22, 2014

(86) PCT No.: PCT/GB2014/052584
§ 371 (c)(1),
(2) Date: Feb. 19, 2016

(87) PCT Pub. No.: WO2015/025179
PCT Pub. Date: Feb. 26, 2015

(65) Prior Publication Data
US 2016/0208347 A1   Jul. 21, 2016

(30) Foreign Application Priority Data
Aug. 23, 2013   (GB) .................................. 1315092.5

(51) Int. Cl.
*C13B 20/06*   (2011.01)
*C02F 5/06*   (2006.01)
(Continued)

(52) U.S. Cl.
CPC .............. *C13B 20/06* (2013.01); *C02F 1/004* (2013.01); *C02F 1/5236* (2013.01);
(Continued)

(58) Field of Classification Search
None
See application file for complete search history.

(56) References Cited

U.S. PATENT DOCUMENTS 1,755,165 A    4/1930   Bull
3,635,670 A *  1/1972   Kennedy .................. C01D 1/32
                                                       162/29
(Continued)

FOREIGN PATENT DOCUMENTS

BE      816222 A1    12/1974
DE     1140880 B    12/1962
(Continued)

OTHER PUBLICATIONS

Sugar Refining, 2011, https://web-beta.archive.org/web/20110823124922/https://nzic.org.nz/ChemProcesses/food/6E.pdf.*
(Continued)

*Primary Examiner* — Melvin C. Mayes
*Assistant Examiner* — Stefanie J Cohen
(74) *Attorney, Agent, or Firm* — Ballard Spahr LLP

(57) ABSTRACT

The invention relates to a process for the removal of contaminants from a liquor, the process comprising: introducing a metal or ammonium hydroxide into the liquor; introducing the liquor into a reaction vessel; bubbling a carbon dioxide gas comprising at least 25% carbon dioxide through the liquor within the reaction vessel; and separating the precipitate formed by the carbonatation of the metal hydroxide from the liquor, the precipitate comprising at least some of the contaminants from the liquor; wherein, on average, the liquor is resident within the reaction vessel for a period of no more than about 60 minutes. The invention also relates to a process for the removal of contaminants from a liquor, the process comprising: introducing a metal or ammonium hydroxide into the liquor and bubbling a carbon dioxide gas comprising at least 25% carbon dioxide through
(Continued)

| Table 3 | | Filterability (time to filter 50 ml unless otherwise stated) | Colour Removal (%) | Particle Size (microns) | Shape of Particles |
|---|---|---|---|---|---|
| Conventional Carbonatation Process Stage B | | 6 min 53 sec | 50.1% | No Data | No Data |
| Exp 5 | 99.95% $CO_2$ | 5 min 24 sec | 44.4% | No Data | No Data |
| Exp10 | 99.95% $CO_2$ | 5 min 23 sec | 43.6% | No Data | No Data |
| Exp8 | 99.95% $CO_2$ | 35mls took 15 min 32 sec | 41.8% | No Data | No Data |
| Exp 9 | 99.95% $CO_2$ | 14 min 20sec | 42.5% | No Data | No Data |
| Exp13 | 99.95% $CO_2$ | 6 min 34 sec | 53% | No Data | No Data |
| Exp16 | 99.95% $CO_2$ | 8 min 20 sec | 65% | No Data | No Data | the liquor to form a precipitate by carbonatation in a period of no more than about 60 minutes. The carbonatation processes may be included in sugar refining or water softening and/or decontamination processes. A use of a carbon dioxide gas comprising at least 25% carbon dioxide in a carbonatation process for removing contaminants from a hydroxide-treated liquor is also provided, wherein the process forms a precipitate in a period of no more than about 60 minutes.

25 Claims, 3 Drawing Sheets

(51) Int. Cl.
| | | |
|---|---|---|
| *C02F 1/00* | (2006.01) | |
| *C02F 1/52* | (2006.01) | |
| C02F 1/68 | (2006.01) | |
| C02F 101/30 | (2006.01) | |
| C02F 103/32 | (2006.01) | |

(52) U.S. Cl.
CPC .............. *C02F 1/5245* (2013.01); *C02F 5/06* (2013.01); *C02F 1/68* (2013.01); *C02F 2101/308* (2013.01); *C02F 2103/32* (2013.01); *C02F 2209/06* (2013.01); *Y02A 20/156* (2018.01)

(56) References Cited

U.S. PATENT DOCUMENTS

| | | |
|---|---|---|
| 3,639,206 A | 2/1972 | Spruill |
| 3,669,620 A | 6/1972 | Tate |
| 2008/0234472 A1 | 9/2008 | Leinhos et al. |
| 2013/0183526 A1* | 7/2013 | Bracilovic .............. C22B 26/10 428/402 |

FOREIGN PATENT DOCUMENTS

| | | |
|---|---|---|
| DE | 2704235 A1 | 8/1978 |
| EP | 2332887 A1 | 6/2011 |
| FR | 1254448 A | 2/1961 |
| GB | 1239407 A | 7/1971 |
| GB | 1315092.5 | 8/2013 |
| GB | 1415000.7 | 8/2014 |
| WO | WO-00/71758 A1 | 11/2000 |
| WO | WO-02/097189 A1 | 12/2002 |
| WO | PCT/GB2014/052584 | 8/2014 |

OTHER PUBLICATIONS

Ryu et al, Effect of the pH and Basic Additives on the Precipitation of Calcium Carbonate during Carbonation Reaction, 2007, resources processing, 54, pp. 14-18.*
Combined Search and Examination Report under Sections 17 and 18(3) dated Sep. 26, 2014 by the Intellectual Property Office of Great Britain for application GB1415000.7 (Applicant—T&L Sugars Limited // Inventor—Kerr, et al.) (7 pages).
Combined Search and Examination Report under Sections 17 and 18(3) dated Sep. 26, 2013 by the Intellectual Property Office of Great Britain for application GB 1315092.5 (Applicant—T&L Sugars Limited // Inventor—Kerr, et al.) (14 pages).
International Search Report and Written Opinion dated Nov. 27, 2014 for application PCT/GB2014/052584, filed Aug. 22, 2014 and published as WO 2015/025179 on Feb. 26, 2015 (Applicant—T&L Sugars Limited // Inventor—Kerr, et al.) (12 pages).
International Preliminary Report on Patentability dated Jan. 7, 2016 for application PCT/GB2014/052584, filed Aug. 22, 2014 and published as WO 2015/025179 on Feb. 26, 2015 (Applicant—T&L Sugars Limited // Inventor—Kerr, et al.) (12 pages).
Schiweck, et al., "Some thoughts on the classical method of juice purification", The Sugar Journal, vol. 47, No. 11, Apr. 1985, pp. 18-22.
http://en.wikipedia.org/wiki/Carbonatation, last modified on Feb. 21, 2016 (3 pages).

* cited by examiner

Fig. 2

| Table 1 | Filterability | Colour Removal (%) | Particle Size (microns) | Shape of Particles |
|---|---|---|---|---|
| Conventional Carbonatation Sample | 50 ml in 7 minutes | 66.0% | 5 to 15 | Round coloured collection of calcium carbonate crystals |
| Parr Carbonatation Reactions | | | | |
| Parr reactor at 82 °C, 3.0 bar $CO_2$ 99.95%, 1.0 % CaO on DSB | Unable to be filtered | 50.8% | 6 to 14 | Elongated collection of calcium carbonate crystals |
| Parr reactor at 82 °C, 3.0 bar $CO_2$ 99.95%, 1.0 % CaO on DSB | Unable to be filtered | 42.3% | 8 to 10 | Elongated collection of calcium carbonate crystals |
| Parr reactor at 82 °C, 4.0 bar $CO_2$ 99.95%, 0.8 % CaO on DSB | Unable to be filtered | 27.2% | 4 to 8 | Elongated collection of calcium carbonate crystals |

Fig. 3

| Table 2a | Filterability | Colour Removal (%) | Particle Size (microns) | Shape of Particles |
|---|---|---|---|---|
| Conventional Carbonatation Sample | 50 ml in 7 minutes | 66.0% | 5 to 15 | Round coloured collection of calcium carbonate crystals |
| Parr Carbonatation Reactions | | | | |
| Parr reactor at 82 °C, 1 bar $CO_2$ 99.95%, 1.0% CaO on DSB | 25 mls in 30 minutes | 62.5% | 5 to 15 | Elongated collection of calcium carbonate crystals |
| Parr reactor at 70 °C, 1 bar $CO_2$ 99.95%, 1.0% CaO on DSB | 24 mls in 30 minutes | 62.5% | 10 to 16 | Elongated collection of calcium carbonate crystals |
| Parr reactor at 82 °C, 1 bar, $CO_2$ 99.95%, 0.7% CaO on DSB | 21 mls in 30 minutes | 64.1% | 6 to 12 | Elongated collection of calcium carbonate crystals |
| Parr reactor at 70 °C, 1 bar $CO_2$ 99.95%, 0.7% CaO on DSB | 24 mls in 30 minutes | 64.6% | 6 to 12 | Elongated collection of calcium carbonate crystals |

Fig. 4

Table 2b

| | Filterability (time to filter 50 ml) | Colour Removal (%) | Particle Size (microns) | Shape of Particles |
|---|---|---|---|---|
| Conventional Carbonatation Process Stage A | 6 min 40 sec | 59.1% | 5 to 15 | Round coloured collection of calcium carbonate crystals |
| Laboratory Scale Single Stage Carbonatation 99.95% $CO_2$ | | | | |
| 1 litre exp | 7 min 20 sec | 53.7% | 10 to 19 | Round coloured collection of calcium carbonate crystals |
| 2 litre exp | 6 min 22 sec | 52.9% | 14 to 24 | Round coloured collection of calcium carbonate crystals |
| 3 litre exp | 7 min 50 sec | 53.1% | 12 to 18 | Round coloured collection of calcium carbonate crystals |
| 3 litre exp | to be checked | 51.4% | 21 to 30 | Round coloured collection of calcium carbonate crystals |
| 4 litre exp | 8 min 23 sec | 53.7% | 13 to 19 | Round coloured collection of calcium carbonate crystals |

Fig. 5

Table 3

| | Filterability (time to filter 50 ml unless otherwise stated) | Colour Removal (%) | Particle Size (microns) | Shape of Particles |
|---|---|---|---|---|
| Conventional Carbonatation Process Stage B | 6 min 53 sec | 50.1% | No Data | No Data |
| Exp 5 | 5 min 24 sec | 44.4% | No Data | No Data |
| Exp10 | 5 min 23 sec | 43.6% | No Data | No Data |
| Exp8 99.95% $CO_2$ | 35mls took 15 min 32 sec | 41.8% | No Data | No Data |
| Exp 9 99.95% $CO_2$ | 14 min 20sec | 42.5% | No Data | No Data |
| Exp13 99.95% $CO_2$ | 6 min 34 sec | 53% | No Data | No Data |
| Exp16 99.95% $CO_2$ | 8 min 20 sec | 65% | No Data | No Data |

PROCESS INCLUDING A CARBONATION STEP

CROSS-REFERENCE TO RELATED APPLICATIONS

This is a U.S. National Phase Application of International Application No. PCT/GB2014/052584, filed Aug. 22, 2014, which claims the benefit of Great Britain Application No. 1315092.5, filed on Aug. 23, 2013, which are both incorporated herein by reference in their entirety.

FIELD

The invention relates to improvements to processes including a carbonatation step.

BACKGROUND

Carbonatation is used in a variety of different processes to remove impurities such as, but not limited to, unwanted ions or high molecular weight compounds from liquids. The processes generally involve the addition of a metal or ammonium hydroxide whose carbonate is as least partially insoluble under the conditions employed. Carbon dioxide ($CO_2$) is also added, resulting in the formation of an insoluble carbonate as a precipitate which may be separated from the liquid, for example by filtration.

SUMMARY

In some embodiments, according to a first aspect of the invention, a process for the removal of contaminants from a liquor is provided, the process comprising: introducing a metal or ammonium hydroxide into the liquor; introducing the liquor into a reaction vessel; bubbling a carbon dioxide gas comprising at least 25% carbon dioxide through the liquor within the reaction vessel; and separating the precipitate formed by the carbonatation of the metal or ammonium hydroxide from the liquor, the precipitate comprising at least some of the contaminants from the liquor; wherein, on average, the residence time is no more than about 60 minutes and wherein the size of the precipitate may be at least partially controlled or controllable by altering (a) the residence time of the liquor in the reaction vessel or (b) the pH profile of the liquor in the reaction vessel.

In some embodiments, the size of the precipitate may be at least partially controlled or controllable by altering (a) the residence time of the liquor in the reaction vessel and (b) the pH profile of the liquor in the reaction vessel.

In some embodiments, on average, the residence time is no more than about 30 minutes, or the residence time is from about 20 to about 25 minutes.

In some embodiments, the flow rate of carbon dioxide gas into the reaction vessel may be controlled or controllable by monitoring the pH of the liquor.

In certain embodiments, the pH of the liquor introduced into the reaction vessel may be from about 10.5 to about 11.

In some embodiments, the pH of the liquor within the reaction vessel may be from about 3 to about 12.

In some embodiments, the pH of the liquor exiting the vessel may be from about 8.1 to about 8.3.

In some embodiments, wherein the residence time is controlled by one or more of: (i) the flow rate of the liquor into the reaction vessel; (ii) the working volume of the reaction vessel and its associated pipework; and (iii) the amount of liquor being recycled into the reaction vessel.

In some embodiments, the pH of the liquor in the reaction vessel may be at least partially controlled or controllable by recycling a portion of the liquor into the reaction vessel.

In some embodiments, the precipitate may be separated from the liquor when it reaches a size of at least about 5 μm, or from about 5 μm to about 60 μm.

In some embodiments, the flow rate of the liquor into the reaction vessel may be up to about 120 m³/h.

In some embodiments, the carbon dioxide gas comprises from about 50% to about 100% carbon dioxide, or comprises at least about 99% carbon dioxide.

In some embodiments, the carbon dioxide gas bubbled into the liquor is recycled and reintroduced into the reaction vessel, optionally in combination with fresh carbon dioxide gas.

In some embodiments, at least 85% of the carbon dioxide bubbled through the liquor is either used in the carbonatation reaction or is recycled.

In some embodiments, the metal hydroxide is calcium hydroxide.

In some embodiments, the precipitate formed by the carbonatation of the metal hydroxide is separated from the liquor by filtration.

In some embodiments, according to a second aspect of the invention, a process for the removal of contaminants from a liquor is provided, the process comprising: introducing a metal or ammonium hydroxide into the liquor and bubbling a carbon dioxide gas comprising at least 25% carbon dioxide through the liquor to form a precipitate by carbonatation in a period of no more than about 60 minutes and wherein the size of the precipitate may be at least partially controlled or controllable by altering (a) the residence time of the liquor in the reaction vessel or (b) the pH profile of the liquor in the reaction vessel.

In some embodiments, the precipitate is formed in a period of no more than about 30 minutes.

In some embodiments, the carbonatation process may take place in a single reaction vessel.

In some embodiments, according to a third aspect of the invention, a sugar refining process is provided, comprising a process according to the first or second aspects.

In some embodiments, according to a fourth aspect of the invention, a water softening or decontamination process is provided, comprising a process according to the first or second aspects.

In some embodiments, according to a fifth aspect of the invention, a use of a carbon dioxide gas comprising at least 25% carbon dioxide in a carbonatation process for removing contaminants from a hydroxide-treated liquor is provided, wherein the process forms a precipitate in a period of no more than about 60 minutes and wherein the size of the precipitate may be at least partially controlled or controllable by altering (a) the residence time of the liquor in the reaction vessel or (b) the pH profile of the liquor in the reaction vessel.

BRIEF DESCRIPTION OF DRAWINGS

For the purposes of example only, embodiments of the invention are described below with reference to the accompanying drawings, in which:

FIGS. 2 to 5 are tables of data which are referred to in the Examples.

DETAILED DESCRIPTION

Figure 1:
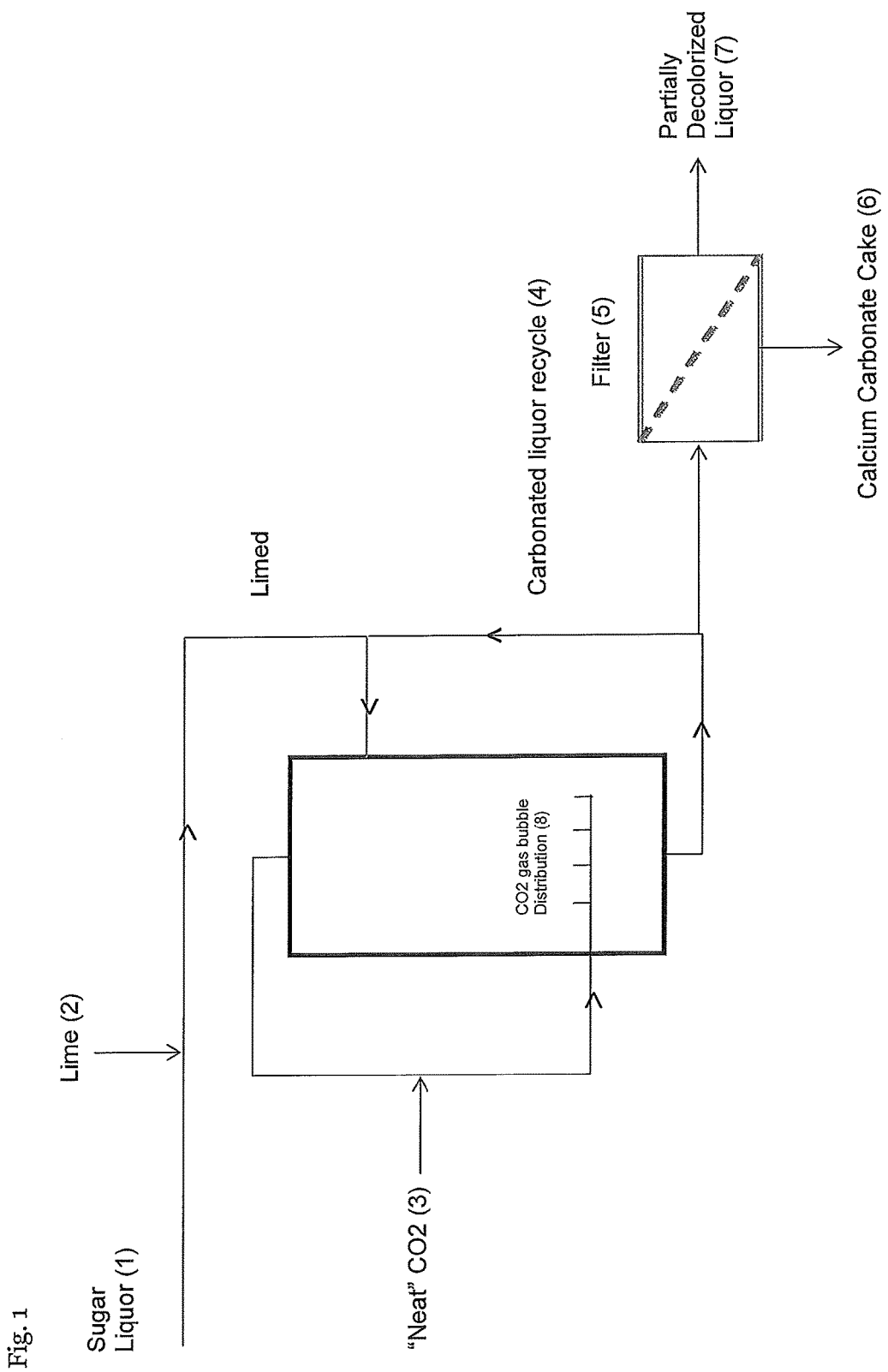
FIG. 1 is a schematic illustration of a carbonatation process for a sugar liquor.

Carbonatation is a chemical reaction in which a hydroxide reacts with carbon dioxide and forms an insoluble carbonate.

For example, the hydroxide may be calcium hydroxide, so that calcium carbonate is formed:

$$Ca(OH)_2 + CO_2 \rightarrow CaCO_3 + H_2O$$

Carbonatation is used in a variety of different ways as part of a variety of different processes. In some of these processes, the carbonatation is used to remove undesirable constituents or contaminants.

For example, carbonatation may be used in sucrose refining. In such processes, calcium hydroxide, which is also commonly referred to as "lime", is added to a coloured sucrose syrup, often in the form of an aqueous calcium hydroxide suspension (known as limewater and often formed by adding calcium oxide to water). The mixture is agitated and $CO_2$ is bubbled into the mixture. This causes calcium carbonate to form and precipitate out of the solution. During the precipitation and subsequent flocculation that the calcium carbonate undergoes, colour bodies in the syrup are bound up and trapped in the precipitate:

$$Ca(OH)_2 + CO_2 + \text{free colour bodies} \rightarrow Ca(CO_3) \text{ with bound colour bodies} + H_2O$$

By subsequently filtering the resulting suspension to remove the calcium carbonate and bound colour bodies through a suitable filter medium, colour bodies can be readily removed from the syrup, forming a partially decolourised liquor for further processing.

In practice, the source of the carbon dioxide is often the flue gases from boilers used on site. These gases can contain up to 10-15% $CO_2$.

The standard carbonatation processes suffer from a number of issues.

Firstly, the use of $CO_2$ is inefficient. Typically only 25-35% of the $CO_2$ fed into the reaction vessel is converted into calcium carbonate. The rest is usually vented to atmosphere. Systems have been developed for improving the standard carbonation process (e.g. improved apparatus for introducing the $CO_2$ into the reaction vessel, such as Richter tubes) but these improvements still only give 35-45% $CO_2$ efficiency.

Secondly, the standard processes can be quite variable and difficult to control.

Thirdly, the standard processes can be slow. Consequently, it may be necessary to use larger reaction vessels to achieve the desired rate of throughput of the liquor and/or to conduct the reaction in a series of stages in separate vessels. Typically, the carbonatation process used in sugar refining is completed in two or more steps, each of which can take approximately 40 to 45 minutes. Therefore, the whole carbonatation process will generally take at least about 1.5 hours.

In light of the foregoing, embodiments of the invention seek to address, at least partially, one or more of the issues outlined above. In particular, certain embodiments of the invention seek to achieve one or more of the following improvements:

1) To increase the efficiency of $CO_2$ usage to at least about 70%.
2) To provide a process that can be closely controlled and is more robust.
3) To provide a process that can be completed much more quickly, resulting in the possibility of using smaller tanks and/or shortened residence times.
4) To provide a process that may be carried out in a single step or stage and/or in a single reaction vessel.

The improved carbonatation processes disclosed and claimed herein may be used in processes in which carbonatation is currently used, to gain one or more of the above mentioned advantages. In addition, the improved carbonatation processes may make the use of a carbonatation process feasible or more attractive (for example, from a commercial or practical perspective), so that it may replace alternative reactions or processing steps.

Thus, for example and by no means intended to be limiting, the carbonatation processes according to the present invention may be used as part of sugar refining processes and other processes where the novel process makes carbonatation more viable. As discussed above, it is already known to use carbonatation in sugar and High Intensity Sweetener refining processes.

In addition, the carbonatation processes according to the present invention may also be used in the treatment of waste streams from various industries, for the removal of undesired constituents and contaminants. For example, the waste streams may be waste water (both in the water industries and other industries) and the carbonatation processes of the invention may be used to remove undesired constituents or contaminants from the water.

In one embodiment, the waste water is, for example, the regenerant water produced when an ion exchange resin is regenerated. Ion-exchange resins are widely used in different separation, purification, and decontamination processes. The most common examples are water softening and water purification, juice purification and in the manufacture of sugar. An ion exchange resin works by exchanging sodium for contaminants in the liquid being filtered/treated. In the case of water softening, the contaminants might be calcium and magnesium ions, in the case of ion exchange resins used in sugar processing, they might be colour bodies and non-coloured components.

When an ion exchange resin requires regeneration, this is achieved by washing the resin with a salt solution, such as brine (a sodium chloride solution). This reverses the reaction, releasing the trapped contaminants in exchange for the sodium in the brine. The resulting ion exchange regenerant material may have high concentrations of salt and contaminants and this regenerant may be treated using a carbonatation process according to the present invention to remove those contaminants and produce water with significantly reduced total dissolved solids and a precipitate containing trapped contaminants.

The carbonatation processes described herein remove undesired constituents, also referred to interchangably herein as contaminants, from a starting material or liquor. The term liquor as used herein means a liquid (optionally in the form of a solution or suspension) which includes contaminants. In some embodiments, the liquor may be a liquid that has been produced or used in a process.

Water softening is a well known industrial process which may benefit from the novel carbonatation process disclosed herein. "Hard" water includes multivalent cations such as calcium ($Ca^{2+}$) and magnesium ($Mg^{2+}$) which are to be removed to produce softened water. Removal of the multivalent cations is typically achieved by adding sodium hydroxide or sodium carbonate. This results in the precipitation of the less soluble (divalent) carbonates, for example by either or both of the following reactions:

$$Mg^{2+} + CO_3^{(2-)} \rightarrow MgCO_3$$

$$Ca^{2+} + CO_3^{(2-)} \rightarrow CaCO_3$$

As particular examples which should not be interpreted as being limited, the liquor may be, for example, a liquid which has been produced as part of the sugar refining process.

Particularly, it may be the liquid resulting from the affination step. Alternatively, the liquor may be waste water, in the form of a solution or suspension. For example, the waste water may result from a rinsing or cleaning step, including, for instance, an ion exchange regenerant material which may contain contaminants from the regeneration of the ion exchange resin. As used herein, the term "ion exchange regenerant material" refers to any material exiting the resin during the regeneration process. Alternatively, the liquor may be hard water, which is water containing multivalent cations as undesired constituents or contaminants which are to be removed.

At least some of the improvements associated with the process of the invention as listed above may be achieved by utilising a carbon dioxide gas having a high concentration of $CO_2$, meaning that the concentration of the $CO_2$ added to the reaction vessel is from about 25 to about 100% pure $CO_2$. In some preferred embodiments, the $CO_2$ concentration is at least about 30%, 35%, 40%, 45%, 50%, 55%, 60%, 65%, 70%, 75%, 80%, 85%, 90%, 95%, 97%, 98%, 99%, 99.5%, 99.6%, 99.7%, 99.8%, 99.9% or at least about 99.95% pure $CO_2$, or the gas may be 100% pure $CO_2$.

One consequence of the use of a high concentration of $CO_2$ is that it has a significant effect on the speed of the carbonatation reaction. The metal carbonate precipitate forms very quickly and this has an effect on the size and shape of the particles of precipitate and on the size of the flocs formed. The precipitate formed in an uncontrolled carbonatation process using high concentration $CO_2$ is fine and the precipitate particles may be elongate in shape, rendering the particles of precipitate difficult to separate from the liquor by filtration. The whole carbonatation process is rendered useless if the precipitate cannot be separated from the liquor. If the separation requires special processes and equipment, this can add significantly to the time the process takes and the cost, reducing the efficiency of the process to remove contaminants.

Generally, the precipitate may be separated from the liquor using various techniques such as filtration, decantation, centrifugation and other such methods. Often, the carbonation process will be associated with a particular separation technique and it may be preferred to continue with the existing technique where an existing carbonatation process is being improved using the invention. In the case of sugar refining, the carbonatation process will often involve a filtration step to remove the precipitate and it may be desirable to retain this mode of separation, as the equipment will be in place.

Filters that might be considered suitable for the filtration step are well known in the art. Suitable filters include, for example, Putsch presses, Gaudfrin filters and candle filters.

In some embodiments, the precipitate may be removed from the liquor continuously using filtration. Alternatively, it may, in some embodiments, be preferable to allow the precipitate to build up on the surface of the filtration medium so as to form a bed of precipitate. This bed may then act to improve the filtration characteristics of the filter.

In some embodiments, the processes of the present invention therefore include measures to control the precipitate formation and to increase the size of the particles of precipitate and/or of the flocs formed so that they may be separated from the liquor using standard filtration processes.

The high concentration $CO_2$ added to the liquor accelerates the formation of particles of carbonate precipitate, but the growth of the crystals and flocculation can be controlled to result in larger particles that may be filtered.

The so-called "residence time" is the time that the average metal ion in the hydroxide-treated liquor would spend in the reaction vessel. Put another way, it is the average period of time over which the metal or similar (e.g. ammonium) cations will be exposed to the anionic carbon dioxide species in solution and/or the carbon dioxide itself so that the carbonatation reaction may take place. During the course of this residence time, the cation will be converted into a carbonate species which then forms a crystal. This crystal then grows in size and flocculates with colour bodies and other crystals to form the larger carbonate "flocs" that are then separated out of solution, for example by filtration. The residence time may alternatively be defined as being the average period of time for which the liquor is resident within the reaction vessel.

Thus, the particle size of the precipitate can be controlled by the residence time of the liquor in the reaction vessel. This may be adjusted by a number of factors, one being a recycling of a proportion of the liquor exiting the reaction vessel, so that this is fed back into the reaction vessel. The percentage of the liquor being recycled can be varied to control the residence time and the size of the calcium carbonate precipitate.

In some embodiments, the nature of the precipitate, for example its mass, density, shape and particle-size distribution may be controlled or controllable by recycling a portion of the liquor into the reaction vessel.

The size distribution of the precipitate will be affected by a number of factors, such as the size and shape of the vessel, the location at which the $CO_2$ and pre-carbonated liquor are introduced into the vessel and how efficiently the liquor is mixed within the vessel.

Mixing of the liquor may be achieved using any suitable method. For example, the vessel may be equipped with an agitation means to mix the contents of the vessel. In some embodiments, the agitation means may be any means suitable for mixing the contents of the vessel, such as an impeller, turbine or paddle. Additionally or alternatively, mixing may be effected by the bubbling of the $CO_2$ through the liquor.

Whilst it is important that the liquor is well-mixed, care must be taken to ensure that the size of the precipitate is not reduced by the mixing technique. For example, vigorous stirring of the liquor with an impeller may well cause the precipitate that has already formed to break-up. Thus, in some embodiments, it is important that the mixing technique is gentle enough to ensure that the size of the precipitate is not reduced, whilst at the same time providing a well-mixed liquor.

Mixing of the liquor may also be achieved by continuously withdrawing the liquor from the vessel and reintroducing it into the vessel at a different location. Such recycling or recirculation can be a much more efficient way of mixing a liquor which comprises a large proportion of particulate material (for example, viscous or slurry-like liquors) and is difficult to mix using conventional means. In addition, recirculation does not subject the liquor to high shear forces and the like, and so the precipitate does not fragment.

The liquor may be withdrawn from and returned to the vessel at any suitable point. As previously discussed, the size distribution of the precipitate may vary throughout the volume of liquor in the vessel. Thus consideration may be given to the locations at which the liquor is withdrawn and reintroduced into the vessel. For example, in some embodiments, it may be advantageous to withdraw the liquor from the base of the vessel and reintroduce it into a different (for example upper) region of the vessel.

In certain embodiments, the liquor may be reintroduced directly into the vessel. Alternatively, or in addition, the recycled liquor may first be combined with the pre-carbonatated liquor prior to reintroduction into the vessel.

Recycling portions of the liquor may also help to seed the mixture. Without wishing to be bound by theory, it has been found that the recycling process influences the particle size, shape and particle-size distribution.

Such recycling also allows the residence time to be accurately controlled without having to increase the size of the reaction vessel, i.e. the working volume of the vessel and its associated pipework, or the use of multiple vessels in series, which would be alternative (or additional) ways to increase the residence time.

In some embodiments, the carbonatation takes place in a single reaction vessel. There may be a number of advantages associated with performing the carbonatation in a single reaction vessel, such as a smaller apparatus footprint, greater efficiency and lower overall running costs. Alternatively, the carbonatation may take place in multiple reaction vessels and/or over a series of steps. In some embodiments, the concentration of $CO_2$ used for each step may be kept the same. Alternatively, different concentrations of $CO_2$ may be used for each carbonatation step.

In some embodiments, the residence time, that is the average period of time for which the liquor is resident within the reaction vessel, is no more than about 60 minutes. In some embodiments, the residence time is no more than about 45 minutes or no more than about 30 minutes.

In some embodiments, the residence time may be selected to provide a suitable or tailored size of precipitate and/or flocs. In some embodiments, the process may involve a residence time of from about 20 to about 25 minutes. In other embodiments, especially where the generation of a fine precipitate is not considered a significant disadvantage, for example, where the precipitate is separated from the liquor by a means other than filtration, the residence time may be as low as from about 1 minute to about 30 minutes.

In some embodiments, the residence time may be from about 1, 2, 3, 4, 5, 6, 7, 8, 9, 10, 11, 12, 13, 14, 15, 16, 17, 18, 19 or 20 minutes. In some embodiments, the residence time may be up to about 60, 55, 50, 45, 40, 35, 30, 28, 26, 25, 24, 23, 22, 21, 20, 19, 18, 17, 16, 15, 14, 13, 12, 11, 10, 9, 8, 7, 6 or 5 minutes.

A further factor which will affect the residence time and can therefore be adjusted to control the size of the particles of precipitate is the liquor flow rate into the reaction vessel (and therefore the flow rate out of the vessel). The flow rate will depend on the size of the vessel and the nature of the process involving the carbonatation step.

In some specific embodiments, which may in particular relate to a carbonatation process being used in the refining of sugar, the liquor including the metal hydroxide, such as calcium hydroxide (formed by adding calcium oxide to water), may be pumped into the reaction vessel at a flow rate of up to about 50, 55, 60, 65, 70, 75, 80, 85, 90, 95, 100, 105, 110, 115 or 120 m$^3$/h. In some embodiments, the liquor may be pumped into the reaction vessel at a flow rate of from about 120, 115, 110, 105, 100, 95, 90, 85, 80, 75, 70, 65, 60, 55 or 50 m$^3$/h. In certain embodiments, the liquor may be pumped into the reaction vessel at a flow rate of about 70, 75, 80, 85, 90, 95, 100 or 105 m$^3$/h. In some embodiments, the flow rate of the liquor into the reaction vessel may be about 76, or about 120 m$^3$/hr. The precise flow rate may be adjusted to control the residence time in the vessel and to match the rate at which the other stages of the refining process are carried out.

In some embodiments, the metal hydroxide may be added to the liquor before bubbling the carbon dioxide gas through the liquor. In other embodiments, the metal hydroxide may be added to the liquor whilst the carbon dioxide gas is being bubbled through the liquor.

In some embodiments, the metal hydroxide is introduced by adding a metal oxide (optionally in water) to the liquor.

The sequence of the steps of introducing the metal hydroxide and $CO_2$ into the liquor will determine the pH changes in the liquor and a balance may need to be struck between ability to control the reaction and avoidance of large pH fluctuations. One possible disadvantage associated with pH changes is that they can trigger unwanted side reactions.

However, conversely introducing the metal hydroxide and $CO_2$ simultaneously can make the overall reaction harder to control. If, for example, the metal or ammonium hydroxide is added before the $CO_2$ is bubbled through the liquor, the amount of hydroxide added may be adjusted to achieve a pH of a target value or within a target range.

The solubility of the metal or ammonium hydroxide in the liquor must also be considered and, in some embodiments, it may be desirable to take steps to ensure that the hydroxide is evenly dispersed within the liquor. This may involve making adjustments to the temperature or pH, and/or stirring or the like. Similarly, in some embodiments it may be desirable to ensure that the $CO_2$ becomes evenly distributed throughout the liquor.

An increased flow rate of liquor compared to that used in conventional carbonatation processes can be accommodated as a result of the use of higher concentration $CO_2$ and the associated faster rate of the carbonatation reaction. This can mean that more liquor may be treated in the same period of time, or a smaller reaction vessel may be used to provide other benefits.

Considering the speed of the reaction, a faster carbonatation reaction may be advantageous, provided that the contaminants, such as the "colour bodies" in a sugar liquor, have time to diffuse to, and stick to, the surface of the carbonate crystal as it forms. The rate of the carbonatation reaction will depend upon the concentration of the carbon ions in the liquor and this depends not only on the concentration of the carbon dioxide gas being bubbled into the liquor but also on the rate at which the $CO_2$ is absorbed.

In some embodiments, the $CO_2$ may be injected into the liquor at a pressure which ensures the efficient dissolution of $CO_2$ into the aqueous phase via small bubbles. The pressure exerted on the bubbles of $CO_2$ influences the size of the bubbles and so, in some embodiments, the size of the bubbles may be controlled by adjusting the pressure. For example, the head pressure in the liquor will contribute to the pressure exerted on the bubbles and therefore will affect the size of the bubbles.

The high concentration carbon dioxide gas may be provided and fed into the reaction vessel for the carbonatation process from a site bulk storage tank. Such bulk storage tanks can, for example, hold 49 tonnes of food grade $CO_2$ and may form part of a site $CO_2$ plant. In some embodiments, the $CO_2$ is warmed to 25° C. with steam and vaporised to 6.0 bar$_g$, then piped to the reaction vessel.

In some other embodiments, the $CO_2$ may be generated on site, rather than being bought. Potentially suitable sources of $CO_2$ include, for example: (i) calcination of $CaCO_3$ on site;

and (ii) recovery of pure $CO_2$ from process off-gases (e.g. flue gas, anaerobic digesters, bioethanol fermentation streams, etc.).

In certain embodiments, the $CaCO_3$ cake produced as a result of the carbonatation may be converted to $CO_2$ for use in the carbonatation step. As is well known, conversion of the $CaCO_3$ into $CO_2$ may be achieved by calcining it.

It may, in some embodiments, be advantageous to introduce the $CO_2$ into the reaction vessel so as to encourage an even distribution of the gas throughout the vessel. In some embodiments, the $CO_2$ enters the vessel via a set of laterals located in the bottom of the vessel which distribute the $CO_2$ evenly.

In some embodiments, any non-dissolved and/or unreacted $CO_2$ is not vented to atmosphere. Instead, the vessel headspace is piped to a gas blower which recompresses the $CO_2$ enabling it to be redistributed through the laterals. As the $CO_2$ is consumed (dissolved and reacted), the headspace pressure of the vessel decreases. Pressure is therefore maintained by supplying fresh $CO_2$ from the $CO_2$ header via a pressure control valve. In some embodiments, the headspace pressure is controlled to 50 mbar above atmospheric.

In some embodiments, it may be necessary to ensure that the bubbles of $CO_2$ are not so small that they have a tendency to form a foam or "mousse". This may be disadvantageous in some carbonatation processes. For example, where the precipitate is separated from the liquor by filtration, the presence of a foam or mousse may hinder the filtration step or may interfere with the recycling of the $CO_2$ from the headspace of the reaction vessel.

If the bubbles are too big, the surface area:volume ratio may be too small to provide the desired rapid and/or effective absorption of $CO_2$ into the aqueous phase.

Economically and operationally, it may be attractive to use a reaction vessel that is not above 1 bar in pressure (and not under vacuum either) as this is then classified as "a non-pressure vessel". In some embodiments, it may be key for the carbonate floc/particle shape and size to be adequate for acceptable filterability and this may be achieved by adjusting the pressure, as discussed in more detail in the examples below.

In some embodiments, the size of the precipitate considered to be suitable for acceptable filterability may be from about 1, 2, 3, 4, 5, 10, 15, 20, 25, 30, 35, 40, 45, 50, 55, 60, 65, or 70 µm. In preferred embodiments, the precipitate is separated from the liquor when it reaches a size of from about 5 µm, or from about 5 to 60 µm.

Traditional carbonatation vessels using low concentration $CO_2$ have a tendency to accumulate a thick layer of calcium carbonate on the gas distributors. This poses a problem in that they must be periodically removed from the vessel and cleaned. Moreover, the gas distributors or laterals may be fixed to the internal wall of the vessel, thus requiring a worker to enter the vessel and remove the laterals for inspection and cleaning. Such operations are labour intensive and expensive.

Surprisingly, it has been found that the use of high concentration and/or purified $CO_2$ leads to reduced formation of scale around the gas distributors. Without wishing to be bound by any particular theory, it is speculated that this may be due to a local reduction in pH.

The $CO_2$ adsorption efficiency may be affected by the rate at which the $CO_2$ is introduced into the vessel. For example, increasing the $CO_2$ flow rate into the reaction vessel may increase the amount of $CO_2$ that is dissolved. The $CO_2$ gas dissolving rate may also be influenced by a number of other parameters such as, for example, the size of the $CO_2$ bubbles and the overall pH profile of the liquor in the vessel. It is important, to ensure that the $CO_2$ flow rate and bubble size is well controlled, not only to optimise the colour removal and filtration processes, but also to avoid any adverse foaming issues.

In some embodiments, the flow rate of $CO_2$ into the reaction vessel via the laterals may be from about 500, 600, 700, 800, 900, 1000, 1250, 1500, 1750 or 2000 kg/h. In some embodiments, the flow rate of $CO_2$ into the reaction vessel via the laterals may be up to about 2000, 1750, 1500, 1250, 1000, 900, 800, 700, 600 or 500 kg/h. In preferred embodiments, the flow rate of $CO_2$ into the reaction vessel may be from about 500 to about 2000 kg/h, from about 600 to about 1500 kg/h, or from about 700 to 900 kg/h.

In some embodiments of the invention, in order to enhance the efficiency of the use of the $CO_2$, the non-dissolved and/or unreacted $CO_2$ is recycled rather than being vented. $CO_2$ is bubbled into the liquor in the reaction vessel. The $CO_2$ which is not absorbed into the liquor and/or which does not react with the hydroxide in the carbonatation reaction will be captured in the reaction vessel and fed back into the system. This recycling of the $CO_2$ enables $CO_2$ efficiencies of at least 85%, at least about 90%, at least about 95%, at least about 98% or at least about 99% to be achieved.

In some embodiments, fresh $CO_2$ being fed into the reaction vessel is combined with recycled $CO_2$ which has passed through the reaction vessel without being utilised/absorbed. Alternatively, or in addition, the fresh $CO_2$ and recycled $CO_2$ may be fed into the reaction vessel via separate conduits.

There are a number of factors in play in carbonatation processes and these all have to be taken into consideration for a typical carbonatation process and for the processes of the present invention. For example, pH control is important in all carbonatation processes, including those of the present invention.

In some embodiments, the size of the precipitate formed as a result of the carbonatation process may be affected by the pH of the liquor in the reaction vessel. In some embodiments, the size of the precipitate may be at least partially controlled or controllable by altering the pH of the liquor.

In some embodiments, the pH of the liquor may vary throughout the reaction vessel (i.e. the liquor will have a "pH profile"). In some embodiments, the pH profile of the liquor may be altered by recycling a portion of the liquor into the reaction vessel. For example, the liquor may be withdrawn from a region of the vessel where the pH is low, and reintroduced into a region of the vessel where the pH is high. Such recycling may affect the pH profile of the liquor in the reaction vessel and hence the size of the precipitate.

In some embodiments, the pH of the liquor in the vessel may be from about 1, 2, 3, 4, 5, 6, 7, 8, 9, 10, 11, 12 or 13 or 14. In some embodiments, the pH of the liquor in the vessel may be up to about 14, 13, 12, 11, 10, 9, 8, 7, 6, 5, 4, 3, 2, 1. In certain embodiments, the pH of the liquor in the reaction vessel may be in the range of from about 2 to about 13, from about 3 to about 12, or from about 4 to about 11.

In some embodiments, the target pH at the end of the carbonatation process is around 8.1-8.3. There are advantages associated with having the pH as close to neutral as possible, but below a pH of about 8 the $CaCO_3$ may re-dissolve in the form of calcium hydrogencarbonate (also known as calcium bicarbonate). This may present, for example, the problems of scaling in the process or downstream of the process.

The addition of the hydroxide to the liquor will increase the pH and it may, in some embodiments, be important to quickly reduce the pH to the target range. This may be achieved by the addition of the $CO_2$. The amount of $CO_2$ required to adjust the pH will be dependent upon the amount of lime added to the liquor.

Whilst the desired pH ranges and need to control the pH of the processes are the same as in traditional carbonatation processes, the processes of the invention may, in some embodiments, offer advantages over some known processes because (i) the carbon dioxide gas has a consistent and reliable $CO_2$ concentration which will not exhibit as much variation as the flue gases used in some known processes; and (ii) the entire carbonatation process is carried out in one vessel so there is a greater chance of controlling the pH more closely with less equipment.

The basic carbonatation process discussed herein and as applied to the processing of sugar is illustrated in FIG. 1.

The starting material is typically the affination liquor, containing about 65% dissolved solids. These solids include contaminants such as colour bodies. The lime added is typically added to the liquor in the form of "milk of lime", an aqueous suspension of calcium hydroxide.

In some embodiments, the aqueous suspension of calcium hydroxide may have a concentration of approximately 10% CaO. This may be a suitable form in which to add the metal hydroxide to a sugar liquor which is a viscous liquor. Where the liquor is essentially contaminated water, the amount of metal hydroxide (i.e. the resultant concentration in the liquor) is likely to be more important than the concentration of the suspension being added.

In some embodiments, the concentration of the metal hydroxide in the liquor may be between about 0.5 and about 1.5%.

The lime is typically added to the sugar liquor prior to the liquor being "gassed" with the $CO_2$ stream. At this point, the liquor stream may have a pH of from 10.5 to 11. The liquor stream may also be heated at this point (for example, from 70 to 80° C.), and the combination of the high temperature and high pH is undesirable as sucrose decomposes rapidly under these conditions. It is therefore important to reduce the pH of the liquor as soon as possible. This may be done by gassing the liquor with $CO_2$.

Following the addition of the lime to the flow of liquor, the limed liquor is introduced into the reaction vessel. In some embodiments, the liquor and lime may be introduced separately into the vessel, but this can make the process harder to control.

Carbon dioxide gas is fed into the reaction vessel. The $CO_2$ is absorbed into the limed liquor via bubbles. The carbon dioxide gas preferably has a $CO_2$ concentration of from 50-100% $CO_2$. In some embodiments, the $CO_2$ concentration is at least 60%, 70%, 80%, 90%, 95%, 97%, 98%, 99%, 99.5% or at least 99.95%.

As discussed above, the $CO_2$ being fed into the liquor in the reaction vessel may include "fresh" $CO_2$ and recycled $CO_2$ and the ratio of this mixture may be reduced as far as possible to maximise the recycling, whilst retaining the desired $CO_2$ concentration. In some embodiments, the ratio of "fresh" to recycled $CO_2$ may be from about 1:1 to about 1:3, and in some embodiments it may be from about 1:2 to about 1:3, or about 1:2 to about 1:2.5.

As the $CO_2$ bubbles move upwards through the limed liquor in the reaction vessel, the dissolved $CO_2$ reacts with the calcium hydroxide, forming calcium carbonate which quickly precipitates out of the solution. The concentration of the $CO_2$ in the liquor affects the speed at which the carbonatation reaction proceeds and the faster the reaction, the smaller the particles of precipitate.

The filter process used to separate the precipitate from the treated liquor may be a standard or traditional filtration process, as this part of the process does not need to be adjusted or adapted.

The mean grain size and size distribution of the calcium carbonate precipitate as well as the shape of the "grains" influences the filterability of the calcium carbonate cake. For filtration, it may be preferable in some embodiments for the precipitate to have a shape which is approximately spherical. This is in contrast to the crystals formed by the most rapid precipitation reactions seen using high concentration $CO_2$, which tend to be elongate or needle-like in shape. The shape of the precipitate is discussed below in the Examples and in the data presented in Tables 1 to 5 of the Figures.

In some embodiments, the average size of the precipitate considered to be suitable for standard or traditional filtration processes may be at least about 5 μm to about 30 μm (for example, see FIG. 2-4). It should be remembered and well understood that the particle size distribution is also critical in determining the filterability of the precipitate. Without wishing to be bound by theory, it is thought that a precipitate having a broad particle size distribution may result in a densely packed filter-cake, through which the passage of liquor to be filtered may be impeded (i.e. the filter may become blocked).

Thus, in some embodiments, it may be important to ensure that the precipitate has a narrow particle-size distribution. It may, in some embodiments, be desirable to vary a number of factors such as, but not limited to, the residence time of the liquor in the reaction vessel, the concentration of $CO_2$ gas introduced into the vessel and the pH profile of the liquor in the vessel in order to obtain a precipitate having the desired particle-size distribution.

The quantity of impurities (e.g. colour bodies) removed from the liquor and the characteristics (e.g. size, particle-size distribution and shape) of the precipitate may give an indication of the overall effectiveness of the carbonatation process. In some embodiments, it may be particularly desirable to remove as much of the colour and other impurities from the liquor as possible, whilst ensuring that the precipitate has characteristics (e.g. size, size-distribution and shape) which are considered desirable for good filtration.

In some embodiments, it may be desirable to achieve both adequate impurity (e.g. colour removal) and good filterability of the liquor. In some embodiments, the impurity removal and size of the precipitate may be affected and/or controlled by the residence time and pH profile of the liquor in the reaction vessel.

Using the process and equipment illustrated in FIG. 1 in treating sugar liquor, in some embodiments from about 40% to about 50% decolourisation can be achieved.

Early experimental work showed that if the $CO_2$ gas pressure was too high, even though the decolourisation of the sugar worked well, the calcium carbonate particles were too fine and the resulting "carbonated liquor" could not be filtered using standard equipment. Hence, significant development work was done to optimize the $CO_2$ gas pressure and to achieve filterability that was as good (or better than) the standard process.

Firstly, by recycling the carbonated liquor, it was determined that a combination of good decolourisation and good filterability could be achieved. This lengthened the residence time in a manner that offers good control and allows for adjustment.

A further advantage was that the rate of the carbonatation step was increased to such an extent that the required residence time in the tank was dramatically reduced compared to the residence time required using the conventional carbonatation process, allowing the whole carbonatation process to be completed in one tank (i.e. as a one step process rather than requiring a second tank to repeat the exposure of the liquor to the carbon dioxide.

Apart from sucrose refining, the process of the present invention may be applied to the removal of colour bodies from any carbohydrate or related streams—including carbonatation of non-aqueous or mixed solvent streams (for example, sucralose streams). It could also be utilized in a new process looking at the removal of divalent species from other ion exchange processes. As well as removing colour bodies, the carbonatation process of the present application may also remove a wide range of other organic and inorganic impurities such as, but not limited to, higher molecular weight waxes, gums and other materials that may be considered to be impurities.

The carbonatation processes described herein may be applied to water softening processes, using the following steps:
1) Raise the pH of the solution to be treated by adding a hydroxide base (e.g. NaOH or $Ca(OH)_2$);
2) Precipitate the divalent ions by bubbling in purified $CO_2$; and
3) Separation of the precipitated calcium carbonate, which may be done using techniques such as filtration, decantation, centrifugation and other such methods.

EXAMPLE 1—Initial Laboratory Tests at Relatively High $CO_2$ Pressure

Initial work focused on the use of $CO_2$ under "high pressure" conditions (2-4 $bar_g$). These reactions were conducted in a Parr reactor. Whilst these experiments "worked" in terms of making calcium carbonate crystals quickly (<5 mins), with reasonable colour removal, the filterability of these crystals was poor and the colour removal was relatively low, compared with the colour removal seen on the commercial scale (see Table 1 in FIG. 2).

Optical microscopy showed that the particles were nonspherical (elongated) and relatively small compared to standard carbonate flocs. It is generally believed that elongated ("needle shaped") crystals are not good for filterability.

It appeared that the crystallisation process was occurring too fast, resulting in crystals/flocs that are too small and not of the right shape for good filterability. However, these results were encouraging, in that they demonstrated that a one-stage carbonatation process could result in fast calcium carbonate formation with reasonable colour removal. It was noted that pH control, temperature and residence time were key parameters that needed to be controlled.

EXAMPLE 2—Further Laboratory Tests at Reduced $CO_2$ Pressure

Given the observations in Example 1, further laboratory tests were completed under relatively low pressures (inlet $CO_2$ pressure 1-2 $bar_g$, outlet pressure ca. 1 $bar_a$). The results are given in Table 2a (see FIG. 3). Further tests were completed at a larger scale (up to 4 liters), with the results given in Table 2b (see FIG. 4). These results—as well as those in Table 1—show that a one-stage process can result in colour removal and filterability close to that achieved on the main plant.

EXAMPLE 3—Pilot Plant Tests at Reduced $CO_2$ Pressure

A larger scale glass pilot plant carbonatation vessel was set up to investigate parameters that could only be checked on a larger scale (effect of liquid height etc.). The results from these tests are shown in Table 3 (see FIG. 5).

From this pilot plant work, the following interim conclusions were drawn:
a) Good filterability and colour removal can be achieved with an apparent residence time of about 30-35 mins (true residence time of about 20-25 mins, with 30% gas voidage);
b) A liquid column height of 3-3.5 meters gives good control of the $CO_2$ gas uptake;
c) The uptake of $CO_2$ in the pilot rig was approximately 50%;
d) Temperature control is critical—the optimum temp is between 70° C. and 80° C. (balance between viscosity and in-situ colour development), in the proposed process the inlet and outlet syrup temperatures are the same;
e) Control of the syrup outlet pH is key and the process may be controlled to establish a final pH through close control of the $CO_2$ and syrup flows.

The invention claimed is:

1. A process for the removal of contaminants from a liquor, the process comprising:
introducing a metal or ammonium hydroxide into the liquor;
introducing the liquor into a reaction vessel;
bubbling a carbon dioxide gas comprising from 50% to 100% carbon dioxide through the liquor within the reaction vessel; and
separating the precipitate formed by the carbonatation of the metal or ammonium hydroxide from the liquor, the precipitate comprising at least some of the contaminants from the liquor;
wherein, on average, the residence time of the liquor in the reaction vessel is no more than 60 minutes; wherein the size of the precipitate is controlled by altering the pH profile of the liquor in the reaction vessel; and wherein the pH profile of the liquor is altered by recycling a portion of the liquor into the reaction vessel.

2. A process as claimed in claim 1, wherein the size of the precipitate is further controlled by altering the residence time of the liquor in the reaction vessel.

3. A process as claimed in claim 1, wherein, on average, the residence time is no more than about 30 minutes.

4. A process as claimed in claim 1, wherein, on average, the residence time is from about 20 to about 25 minutes.

5. A process as claimed in claim 1, wherein flow rate of carbon dioxide gas into the reaction vessel is controlled by monitoring the pH of the liquor.

6. A process as claimed in claim 1, wherein the pH of the liquor introduced into the reaction vessel is from about 10.5 to about 11.

7. A process as claimed in claim 1, wherein the pH of the liquor within the reaction vessel is from about 3 to about 12.

8. A process as claimed in claim 1, wherein the pH of the liquor exiting the vessel is about from about 8.1 to about 8.3.

9. A process as claimed in claim 1, wherein the residence time is controlled by one or more of: (i) the flow rate of the liquor into the reaction vessel; (ii) the working volume of the reaction vessel and its associated pipework; and (iii) the amount of liquor being recycled into the reaction vessel.

10. A process as claimed in claim 1, wherein the precipitate is separated from the liquor when it reaches a size of at least about 5 μm.

11. A process as claimed in claim 10, wherein the precipitate is separated from the liquor when it reaches a size of from about 5 μm to about 60 μm.

12. A process as claimed in claim 1, wherein the flow rate of the liquor into the reaction vessel is up to about 120 m$^3$/h.

13. A process as claimed in claim 1, wherein the carbon dioxide gas comprises at least about 99% carbon dioxide.

14. A process as claimed in claim 1, wherein carbon dioxide gas bubbled into the liquor is recycled and reintroduced into the reaction vessel, optionally in combination with fresh carbon dioxide gas.

15. A process as claimed in claim 14, wherein at least 85% of the carbon dioxide bubbled through the liquor is either used in the carbonatation reaction or is recycled.

16. A process as claimed in claim 1, wherein the metal hydroxide is calcium hydroxide.

17. A process as claimed in claim 1, wherein the precipitate formed by the carbonatation of the metal hydroxide is separated from the liquor by filtration.

18. A process for the removal of contaminants from a liquor, the process comprising: introducing a metal or ammonium hydroxide into the liquor and bubbling a carbon dioxide gas comprising from 50% to 100% carbon dioxide through the liquor to form a precipitate by carbonatation in a period of no more than 60 minutes, wherein the size of the precipitate is controlled by altering the pH of the liquor in the reaction vessel.

19. A process as claimed in claim 18, wherein the precipitate is formed in a period of no more than about 30 minutes.

20. A process as claimed in claim 18, wherein the size of the precipitate is further controlled by altering the residence time of the liquor in the reaction vessel.

21. A process as claimed in claim 18, wherein the carbonatation process takes place in a single reaction vessel.

22. A sugar refining process comprising a process as claimed in claim 1.

23. A water softening or decontamination process comprising a process as claimed in claim 1.

24. A process of carbonatation, comprising using a carbon dioxide gas comprising from 50% to 100% carbon dioxide in a carbonatation process for removing contaminants from a hydroxide-treated liquor, wherein the process forms a precipitate in a period of no more than 60 minutes and wherein the size of the precipitate is controlled by altering the pH profile of the liquor in the reaction vessel, and wherein the pH profile of the liquor is altered by recycling a portion of the liquor into the reaction vessel.

25. A process as claimed in claim 24, wherein the size of the precipitate is further controlled by altering the residence time of the liquor in the reaction vessel.

* * * * *